(12) United States Patent
Han et al.

(10) Patent No.: US 8,928,753 B2
(45) Date of Patent: Jan. 6, 2015

(54) METHOD AND APPARATUS FOR GENERATING A SURROUNDING IMAGE

(75) Inventors: Young In Han, Gyeonggi-do (KR); Young Gi Song, Gyeonggi-do (KR); Won In Back, Gyeonggi-do (KR)

(73) Assignee: Imagenext Co., Ltd., Gyeonggi-Do (KR)

( * ) Notice: Subject to any disclaimer, the term of this patent is extended or adjusted under 35 U.S.C. 154(b) by 621 days.

(21) Appl. No.: 13/143,470

(22) PCT Filed: Dec. 24, 2009

(86) PCT No.: PCT/KR2009/007794
§ 371 (c)(1),
(2), (4) Date: Jul. 6, 2011

(87) PCT Pub. No.: WO2010/079912
PCT Pub. Date: Jul. 15, 2010

(65) Prior Publication Data
US 2011/0285848 A1 Nov. 24, 2011

(30) Foreign Application Priority Data
Jan. 6, 2009 (KR) .................. 10-2009-0000734

(51) Int. Cl.
*H04N 7/18* (2006.01)
*B60R 1/00* (2006.01)

(52) U.S. Cl.
CPC .............. *B60R 1/00* (2013.01); *B60R 2300/102* (2013.01); *B60R 2300/105* (2013.01); *B60R 2300/402* (2013.01); *B60R 2300/607* (2013.01); *B60R 2300/70* (2013.01)
USPC ....................................................... 348/148

(58) Field of Classification Search
CPC B60R 1/00; B60R 2300/70; B60R 2300/402; B60R 2300/607; B60R 2300/105; H04N 7/181
USPC ........................................................ 348/148
See application file for complete search history.

(56) References Cited

U.S. PATENT DOCUMENTS

| 7,352,388 | B2 | 4/2008 | Miwa et al. | |
| 2001/0048446 | A1* | 12/2001 | Ishida et al. | 345/619 |

(Continued)

FOREIGN PATENT DOCUMENTS

| CN | 1659418 A | 8/2005 |
| CN | 101236654 A | 8/2008 |

(Continued)

*Primary Examiner* — William C Vaughn, Jr.
*Assistant Examiner* — Naod Belai
(74) *Attorney, Agent, or Firm* — Rabin & Berdo, P.C.

(57) ABSTRACT

The present invention relates to a method and to an apparatus for generating a surrounding image. The method for generating a surrounding image according to the present invention comprises the steps of: taking, as an input, images captured by cameras installed in the front and the rear of a vehicle and in the left and right sides of the vehicle, via respective channels connected to the cameras; correcting the captured images into a top view form to generate a plurality of corrected images; performing an overlaying process on the plurality of corrected images using a mask image containing region information on each channel and weight information for pixels constituting each region to generate a surrounding image of the vehicle; and displaying the thus-generated surrounding image. The present invention removes blind spots around the vehicle, and corrects the overlapped images captured by a plurality of cameras into natural images, thus enabling drivers to accurately recognize the surrounding situation of the vehicle. Therefore, a driver may park a vehicle in a convenient manner, and drive the vehicle in a forward or a backward direction in a safe manner even without looking at a side-view mirror or a rearview mirror.

8 Claims, 7 Drawing Sheets

(56) References Cited

U.S. PATENT DOCUMENTS

| | | |
|---|---|---|
| 2002/0005896 A1* | 1/2002 | Kumata et al. ............... 348/148 |
| 2002/0196340 A1 | 12/2002 | Kato et al. |
| 2004/0017378 A1* | 1/2004 | Lin et al. ..................... 345/592 |
| 2005/0179801 A1 | 8/2005 | Miwa et al. |
| 2006/0274147 A1* | 12/2006 | Chinomi et al. ............. 348/118 |
| 2007/0085901 A1* | 4/2007 | Yang et al. ................... 348/47 |
| 2008/0231710 A1 | 9/2008 | Asari et al. |

FOREIGN PATENT DOCUMENTS

| | | |
|---|---|---|
| JP | 2002-087160 A | 3/2002 |
| JP | 2002-324235 A | 11/2002 |
| JP | 2003-050107 A | 2/2003 |
| JP | 2007274377 | 10/2007 |
| JP | 2008-187566 A | 8/2008 |
| KR | 2004-0104578 | 12/2004 |

* cited by examiner

FIG. 9
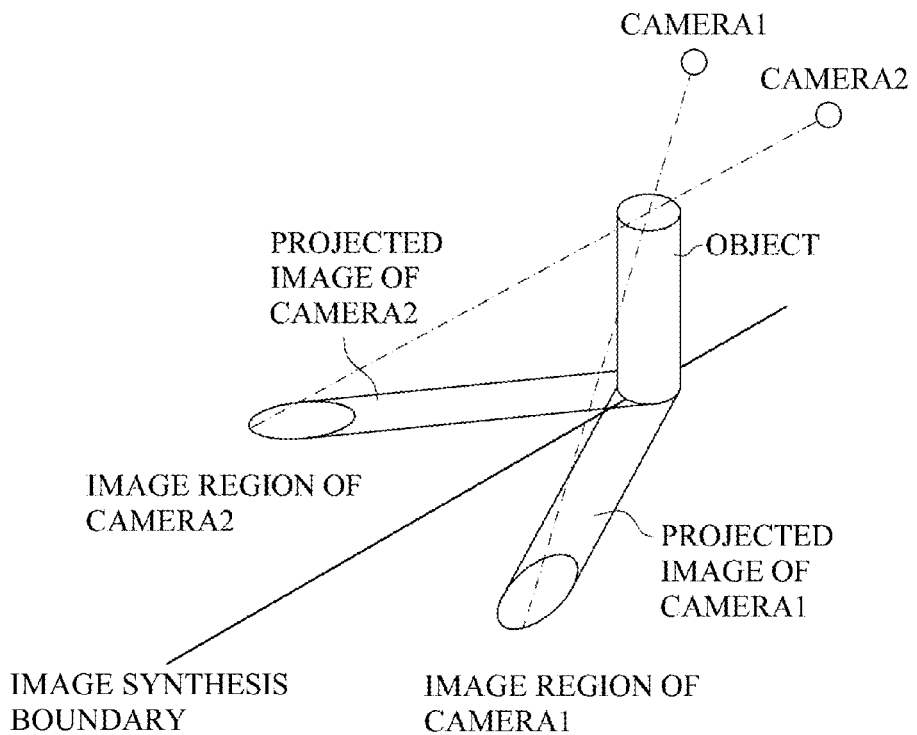
FIG. 10
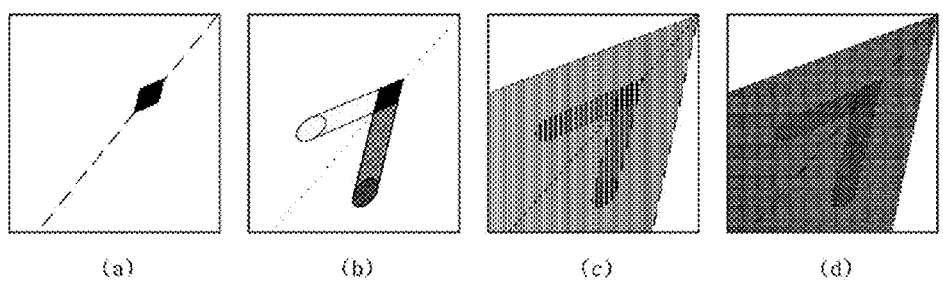
FIG. 11
(a)  (b)  (c)  (d)

METHOD AND APPARATUS FOR GENERATING A SURROUNDING IMAGE

TECHNICAL FIELD

The present invention relates to a method and an apparatus for generating a surrounding image. More particular, the present invention relates to a method and an apparatus for generating a surrounding image of a vehicle by synthesizing images captured by cameras installed in front, rear, left, and right sides of the vehicle.

BACKGROUND ART

In general, since a system for capturing and monitoring a surrounding environment of a vehicle is not commonly installed to the vehicle, a driver has been driven the vehicle forward or backward by checking the front with his/her naked eyes or by checking the rear through a side-view mirror or a rearview mirror.

However, according to a structure of the vehicle, the driver can easily check the front and rear surrounding environment while sitting in a driver's seat, whereas there can be blind spots not checked through the naked eyes or the mirrors. In particular, since a full-size vehicle has many spots which cannot be seen merely through the side-view mirror or the rearview mirror, it is necessary to, before starting the vehicle, check whether there is an obstacle with the naked eyes while looking around the vehicle, thus preventing traffic negligent accidents such as collision or deadly accidents In addition, the driver, who is parking the vehicle, cannot check the left and right sides and the rear at a look. A poor driver inexperienced in the driving is likely to bump against a vehicle parked in vicinity or a post. An obstacle even in the front of the vehicle can be hidden by a frame positioned between a windscreen and a door of the vehicle. When children sitting and playing in front or back of the vehicle are not detected, this may lead to the loss of human life.

Hence, in recent, an apparatus for capturing the surrounding environment through cameras attached to the front, rear, left, and right sides of the vehicle and combining and displaying the captured screen in a navigator screen installed in the driver's seat is under development.

However, the conventional technique which simply combines and displays the front and rear images and the left and right images of the vehicle, cannot naturally process the image of the overlapping region of the images and thus cannot properly remove the blind spots around the vehicle. For example, when the overlapping region captured in both of the front image and the right image is cropped and represented or displayed with some part omitted, the driver may have difficulty in accurately recognizing the current surrounding situation of the vehicle.

DETAILED DESCRIPTION OF THE INVENTION

Technical Object of the Invention

To address the above-discussed deficiencies, an aspect of the present invention is to provide a method and an apparatus for generating a vehicle surrounding image to remove blind spots around the vehicle and to allow a driver to accurately recognize a situation around the vehicle.

[Construction and Operation of the Invention]

According to one aspect of the present invention, a method for generating a vehicle surrounding image includes receiving images captured by cameras installed to front, rear, left, and right sides of a vehicle via channels connected to the cameras respectively; generating a plurality of corrected images by correcting the captured images in a top view form; generating a surrounding image of the vehicle by overlay-processing the plurality of the corrected images using a mask image containing region information per channel and weight information for pixels constituting each region; and displaying the surrounding image.

The generating of the plurality of the corrected images may include correcting distortion of the captured images according to lens distortion of the cameras; transforming a viewpoint of the captured images into the top view form; and rotating, translating, or scaling the captured images transformed into the top view form.

The generating of the plurality of the corrected images may include correcting distortion of the captured images according to lens distortion of the cameras; and projective transforming the captured images into a rectangular top view form.

The plurality of the corrected images may be generated using a look up table. The overlapping regions between the plurality of the corrected images may be overlay-processed using the following equation:

$$I'(t+1) = \alpha I_1(t) + (1-\alpha) I_2(t),\ 0 \leq \alpha \leq 1$$

where $I_1(t)$ and $I_2(t)$ denote image information for the overlapping region input via two channels respectively, $\alpha$ denotes a weight for pixels in the overlapping region, and $I'(t+1)$ denotes the overlay-processed image information.

The mask image may be set to attain a Gradient weight for the pixels in the overlapping region.

The method may further include calculating an average brightness value of four indicators through the camera installed to the front side and applying the average brightness value to the surrounding image.

According to another aspect of the present invention, an apparatus for generating a vehicle surrounding image includes an image input part for receiving images captured by cameras installed to front, rear, left, and right sides of a vehicle via channels connected to the cameras respectively; an image processing part for generating a plurality of corrected images by correcting the captured images into a top view form; an image synthesis part for generating a surrounding image of the vehicle by overlay-processing the plurality of the corrected images using a mask image containing region information per channel and weight information for pixels constituting each region; and a display part for displaying the surrounding image.

The apparatus may further include a control part for overlay-processing the overlapping regions between the plurality of the corrected images using the following equation:

$$I'(t+1) = \alpha I_1(t) + (1-\alpha) I_2(t),\ 0 \leq \alpha \leq 1$$

where $I_1(t)$ and $I_2(t)$ denote image information for the overlapping region input via two channels respectively, $\alpha$ denotes a weight for pixels in the overlapping region, and $I'(t+1)$ denotes the overlay-processed image information.

The apparatus may further include a communication part for receiving and providing driving state information of the vehicle to the control part, and the control part may determine whether to display the surrounding image according to the driving state of the vehicle.

According to yet one aspect of the present invention, a system for generating a vehicle surrounding image includes a plurality of cameras installed to front, rear, left, and right sides of a vehicle for outputting captured images via respective channels; an image generating apparatus for generating a plurality of corrected images by correcting the input captured images into a top view form, and generating a surrounding image of the vehicle by overlay-processing the plurality of the corrected images using a mask image containing region information per channel and weight information for pixels constituting each region; and a display apparatus for displaying the surrounding image.

Effect of the Invention

As set forth above, according to the present invention, by removing the blind spots around the vehicle and correcting the overlapping region captured by the plurality of the cameras into the natural image, the driver can accurately recognize the situation around the vehicle. Therefore, the driver can park the vehicle in the convenient manner and drive the vehicle forward or backward in the safe manner even without looking at the side-view mirror or the rearview mirror.

THE BRIEF DESCRIPTION OF THE DRAWINGS

FIG. 9 is a diagram illustrating a cause of the overlapping region when two cameras capture the same object.

FIG. 10 is a diagram of weight information for pixels in the overlapping region of the mask image according to an embodiment of the present invention.

FIG. 11 is a diagram of an image overlay-processed corresponding to FIG. 10.

BEST MODE FOR CARRYING OUT THE INVENTION

Exemplary embodiments of the present invention are provided by referring to the attached drawings to assist those of ordinary skill in the art in easily implementing the invention.

Figure 1:
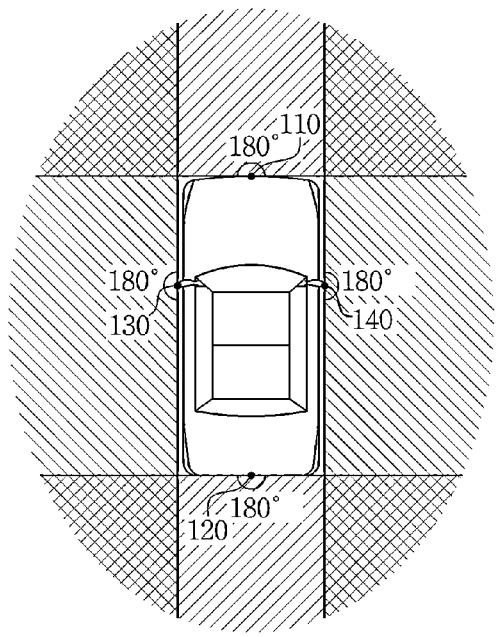
FIGS. 1 through 4 are diagrams of cameras installed to a vehicle according to an embodiment of the present invention.

FIGS. 1 through 4 are diagrams of cameras installed to a vehicle according to an embodiment of the present invention. A surrounding image generating system according to an embodiment of the present invention is a system for securing visibility to allow a driver to check 360° around a vehicle by correcting images captured by four cameras 110, 120, 130, and 140 of a three-dimensional space installed to the vehicle. The cameras 110, 120, 130, and 140 are installed in front, rear, left, and right sides of the vehicle as shown in FIG. 1, and the camera requires an optical angle over at least 180° to minimize blind spots of the vehicle. To enhance quality of the vehicle surrounding image, an installation height of the camera is set to maintain a region of the overlapping view angle of two cameras at least 1000×1000 mm². As the installation height of the camera is high, better image quality can be attained. As such, it is important to set the locations of the cameras to address the blind spots of the vehicle and to set the installation location and the view angle to minimize the image quality degradation of the synthesized surrounding image.

Figure 2:
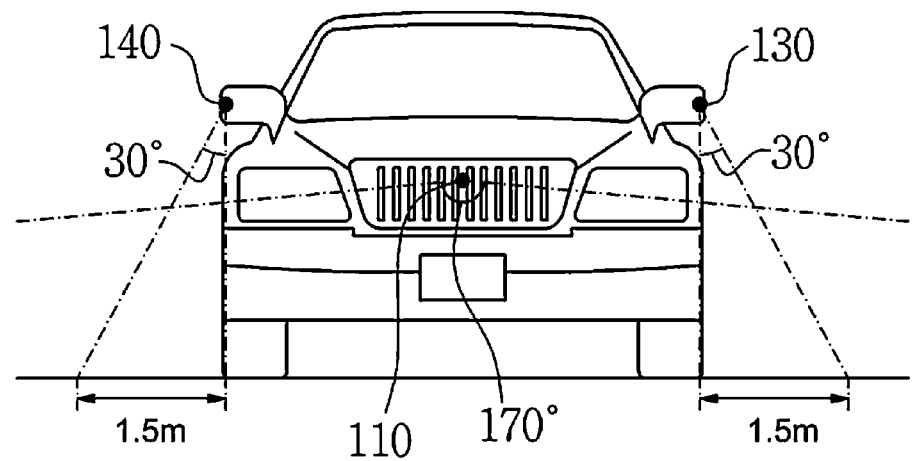
Figure 3:
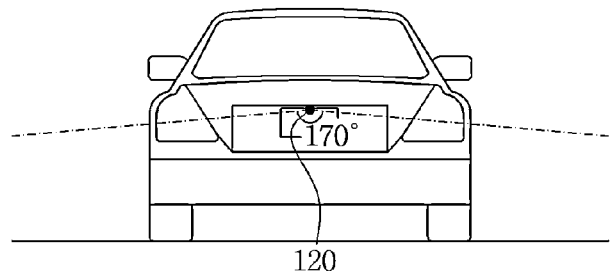
Figure 4:
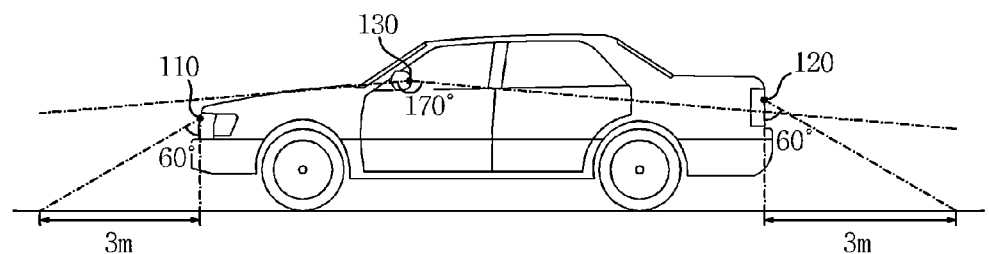

Referring to FIGS. 2 through 4, the locations of the four cameras installed to the vehicle (a sedan car in FIGS. 1 through 4 by way of example) are explained in more detail. As shown in FIG. 2, the front camera 110 is installed to the center of a hood of the vehicle, and the left camera 130 and the right camera 140 are installed at the edge of or below both side-view mirrors of the vehicle. The rear camera 120 is installed to the center above a rear bumper as shown in FIG. 3. Herein, the front camera 110 and the rear camera 120 are installed to capture more than 170° based on the vertical line of the ground direction.

It is preferable to maintain the same height of the front camera 110 and the rear camera 120 and similarly the same height of the left camera 130 and the right camera 140 as shown in FIG. 4. This is to minimize different sizes of a surrounding object, rather than representing the identical area of the lane width in the overlapping region, when the surrounding image is synthesized, because the height and the angle (PAN/TILT) of the camera change scale and image quality of the output image. The left camera 130 and the right camera 140 are installed to capture more than 170° based on the vertical line of the ground direction. Herein, the installation location of each camera varies according to the type of the vehicle and may be limited by a design of the vehicle.

Generally, a wide-angle camera is subject to the image quality degradation because of lack of the light around a lens, and more distortion occurs around the lens than the center of the lens. When the image captured through the camera is viewpoint-transformed, the quality of the image around the lens is severely degraded. Thus, to use the image formed in the center of the camera lens, the front camera 110 and the rear camera 120 are installed such that their optical axis is parallel with the horizon and the left camera 130 and the right camera 140 are installed perpendicularly to the ground.

As shown in FIGS. 2 and 4, the heights of the cameras 110, 120, 130, and 140 are set to capture the range away from the front, the rear, the left side, and the right side of the vehicle about 1.5 m. At this time, the camera can take a picture from about 30° to 60° from the vertical axis based on the ground.

Figure 5:
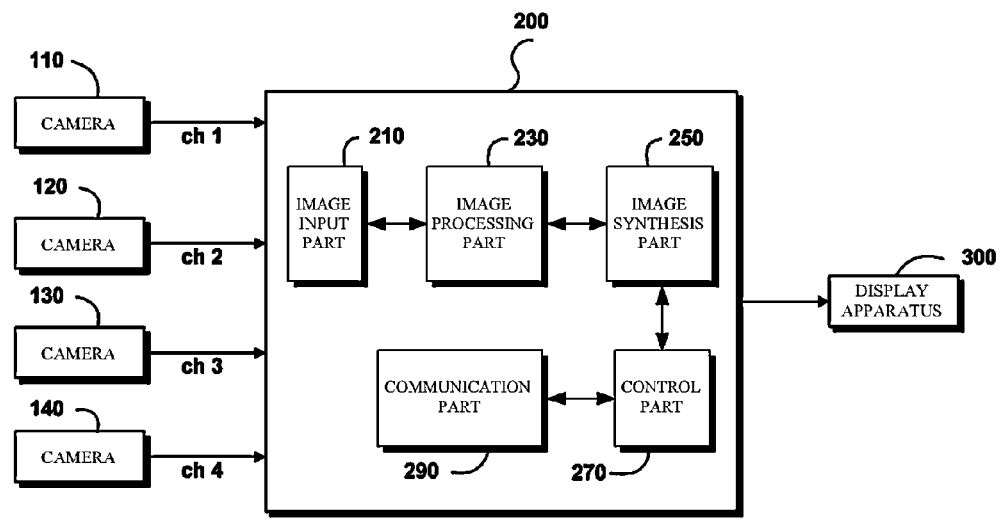
FIG. 5 is a diagram of a structure of a surrounding image generating system according to an embodiment of the present invention.

FIG. 5 is a diagram of a structure of a surrounding image generating system according to an embodiment of the present invention.

As shown in FIG. 5, the surrounding image generating system can include the plurality of the cameras 110, 120, 130, and 140, an image generating apparatus 200, and a display apparatus 300.

The plurality of the cameras 110, 120, 130, and 140 is installed to the front, the rear, the left side, and the right side of the vehicle respectively, and can include a lens of a wide view angle such as wide-angle lens or fisheye lens. The cameras 110, 120, 130, and 140 include a pinhole camera. The cameras 110, 120, 130, and 140 capture a three-dimensional object as two-dimensional images D1, D2, D3 and D4 through the lens of the wide view angle over 170°, and the captured images are sent to the image generating apparatus 200 via four channels ch1, ch2, ch3, and ch4 respectively.

The image generating apparatus 200 includes an image input part 210, an image processing part 230, an image synthesis part 250, a control part 270, and a communication part 290.

The image input part 210 receives the images D1, D2, D3 and D4 captured through the plurality of the cameras 110, 120, 130, and 140 via the respective channels ch1, ch2, ch3, and ch4.

The image processing part 230 processes the captured images D1, D2, D3 and D4 received from the image input part 210 using a look up table, and generates and outputs corrected images E1, E2, E3 and E4 from the captured images D1, D2, D3 and D4. Herein, the look up table can be generated by applying a distortion correction algorithm, an Affine transformation algorithm, and a viewpoint transformation algorithm.

The image synthesis part 250 receives the corrected images E1, E2, E3 and E4 corrected by the image processing part 230, and processes to synthesize the received corrected images E1, E2, E3 and E4 in an overlay scheme which overlaps the images. Herein, the image synthesis part 250 processes the overlay synthesis using a mask image. The mask image contains region information per channel ch1, ch2, ch3, and ch4 and weight information of pixels constituting the corrected image.

The control part 270 controls to naturally display the overlapping region by adjusting the weight of the pixels in the overlapping region between the corrected images E1, E2, E3 and E4.

As such, the image synthesis part 250 generates the surrounding image through which 360° around the vehicle can be perceived at a look by synthesizing and processing the four corrected images E1, E2, E3 and E4 in the overlay manner.

The communication part 290 receives a current driving state signal from gears, a wheel, a speedometer, a driving device of the vehicle through CAN communication or LIN communication. The communication part 290 forwards the received signal to the control part 270, and the control part 270 determines the surrounding image displayed in the display apparatus 300 according to the driving state. For example, to prevent traffic accidents, the control part 270 controls not to display the surrounding image when the vehicle is running at over a certain speed.

The display apparatus 300, which is a device capable of displaying the surrounding image generated by the image synthesis part 250, can be implemented using a display or a navigation installed in the vehicle, and may be included to the image generating apparatus 200.

Figure 6:
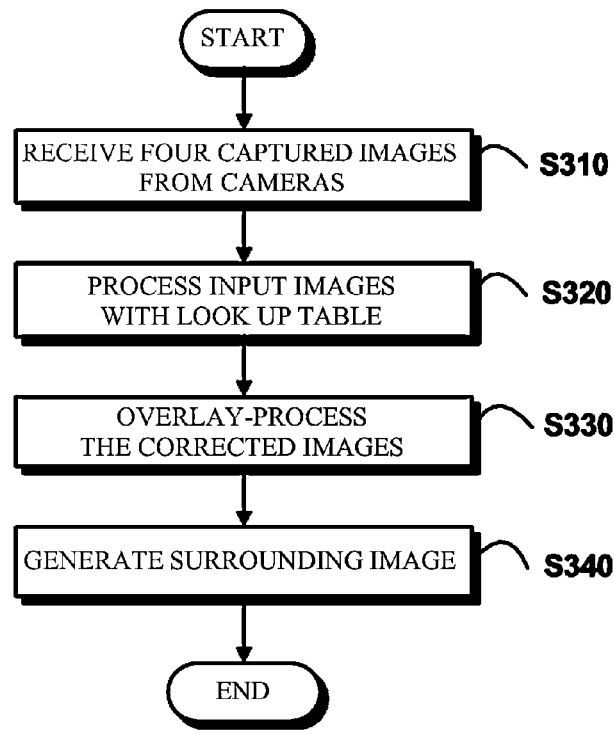
FIG. 6 is a flowchart of a surrounding image generating method according to an embodiment of the present invention.

Herein, a method of the image generating apparatus 200 for generating the surrounding image of the vehicle is explained by referring to FIG. 6. FIG. 6 is a flowchart of the surrounding image generating method according to an embodiment of the present invention.

First, the image generating apparatus 200 receives the images D1, D2, D3 and D4 captured through the cameras 110, 120, 130, and 140 via the channels ch1, ch2, ch3, and ch4 (S310). As stated in FIGS. 1 through 4, the composition of the captured images D1, D2, D3 and D4 varies according to the installation location and height of the cameras 110, 120, 130, and 140.

Next, the image generating apparatus 200 corrects the received captured images D1, D2, D3 and D4 using the look up table (S320) and thus generates the corrected images E1, E2, E3 and E4 fit for the overlay processing. The look up table adopts the distortion correction algorithm, the Affine transformation algorithm, and the viewpoint transformation algorithm, which are described now.

The distortion correction algorithm is an algorithm for correcting geometric distortion caused by the camera lens. Actually, since the wide-angle lens or the fisheye lens is not completely round and has a short focal length, the geometric distortion of the lens, for example, radial distortion or tangential distortion can take place. Due to such lens distortion, a straight line in the captured image can be transformed and represented as a curved line. That is, pincushion distortion where a distortion factor k indicating the distortion of the lens is smaller than zero can occur, or barrel distortion where the lens distortion factor k is greater than zero can occur.

Hence, with the distortion correction algorithm, the geometrically distorted images of the lens can be corrected. Herein, the distortion correction algorithm can be expressed using a function of a correction parameter and the distortion factor. The correction parameter can include the focal length and optical center coordinates of the lens mounted to the camera, and the distortion factor can include a radial distortion factor and a tangential distortion factor.

According to an embodiment of the present invention, the distortion correction algorithm of Equation 1 can be applied.

$$u = f_x \times \{x' \times (1 + k_1 \times r^2 + k_2 \times r^4) + 2p_1 \times x' \times y' + p_2(r^2 + 2x'^2)\} + c_x$$

$$v = f_y \times \{y' \times (1 + k_1 \times r^2 + k_2 \times r^4) + p_1(r^2 + 2y'^2) + 2p_2 \times x' \times y'\} + c_y \quad \text{[Equation 1]}$$

Here, x' and y' denote coordinates of a correction index image on an image plane, u and v denote coordinates on a lens plane to which three-dimensional space coordinates are projected, $f_x$ and $f_y$ denote the focal length of the lens, and $c_x$ and $c_y$ denote the optical center coordinates of the lens. $k_1$ and $k_2$ denote the radial distortion factor, $p_1$ and $p_2$ denote the tangential distortion factor, and $r^2 = x'^2 + y'^2$. Herein, the correction index image can be formed in a lattice shape and is the image used to correct the geometric distortion of the lens.

The Affine transformation indicates point mapping which represents the two-dimensional space in one dimension, and passes through rotation (R), translation (T), and scaling (S) transformations. In general, the Affine transformation can be expressed as Equation 2.

$$W = A \times D + B \quad \text{[Equation 2]}$$

Here, W denotes two-dimensional color image data output through the Affine operation, A denotes a first transformation coefficient for linear magnification and reduction, and rotation of the two-dimensional color image data, D denotes two-dimensional color image data input on the frame basis, and B denotes a second transformation coefficient for linear translation of the two-dimensional color image data D.

The viewpoint transformation algorithm transforms the captured images D1, D2, D3 and D4 input via the four channels into a top view viewpoint. That is, the viewpoint transformation algorithm transforms the viewpoint of the input images D1, D2, D3 and D4 to the image looked down from above.

Figure 7:
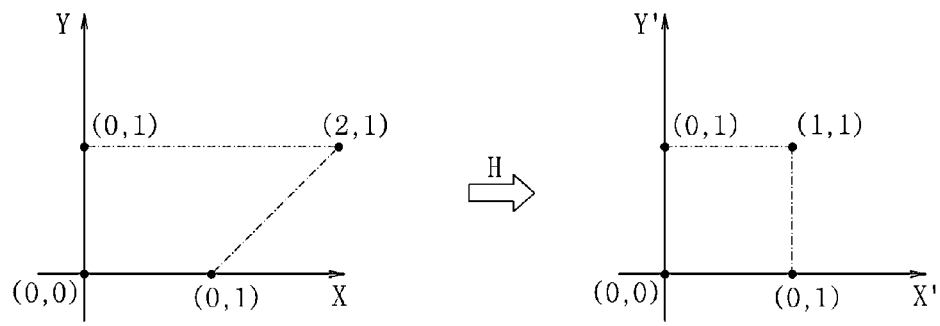
FIG. 7 is a diagram of a projective transformation algorithm according to an embodiment of the present invention.

Meanwhile, according to an embodiment of the present invention, the correction process can be performed using one projective transformation algorithm by replacing the Affine transformation and the viewpoint transformation algorithm. FIG. 7 is a diagram of the projective transformation algorithm according to an embodiment of the present invention.

The point (x, y) generated through the distortion correction algorithm as shown in FIG. 7 is transformed to (x', y') through the projective transformation algorithm H. The projective transformation algorithm H includes a 3×3 matrix as expressed in Equation 3.

$$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x \\ y \\ 1 \end{bmatrix} = H \begin{bmatrix} x \\ y \\ 1 \end{bmatrix} \quad \text{[Equation 3]}$$

The projective transformation algorithm H of Equation 3 can be derived by applying the point (x, y) generated through the distortion correction algorithm and the point (x', y') to generate using the projective transformation into Equation 3. That is, the projective transformation algorithm H can be acquired by applying (0,0), (1,0), (2,1) and (0,1) to (x, y) and applying (0,0), (1,0), (1,1) and (0,1) to (x', y') as shown in FIG. 7 and processing the operation. By means of this projective transformation, it is possible to correct the distortion caused by the tilted camera and to transform the distorted image to the rectangular shape as shown in FIG. 7.

When the look up table is used as in embodiments of the present invention, it is possible to reduce the transformation processing time of the input images D1, D2, D3 and D4. Without using the look up table, the transformation may be processed by applying the distortion correction, the Affine transformation, and the viewpoint transformation, or the distortion correction and the projective transformation to the input images D1, D2, D3 and D4. According to an embodiment of the present invention, the corrected images E1, E2, E3 and E4 output can be changed in various forms according to the setup of the look up table.

The image generating apparatus 200 overlay-processes the corrected images E1, E2, E3 and E4 using the region information per channel ch1, ch2, ch3, and ch4 and the weight information of the pixels stored in the mask image (S330). Herein, the image generating apparatus 200 generates the final surrounding image of the vehicle by overlay-processing the overlapping region between the plurality of the corrected images using the mask image (S340).

Figure 8:
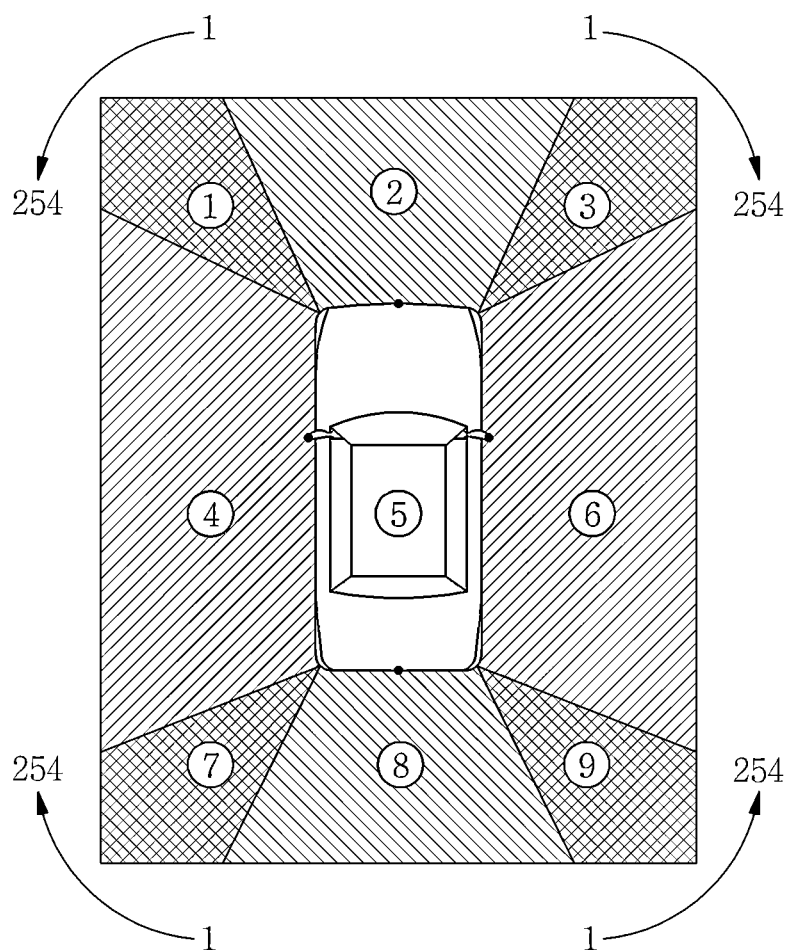
FIG. 8 is a diagram of a mask image according to an embodiment of the present invention.

FIG. 8 is a diagram of the mask image according to an embodiment of the present invention.

According to an embodiment of the present invention, the mask image is used to overlay and synthesize the four corrected images E1, E2, E3 and E4 to one image.

The mask image contains the region information per channel ch1, ch2, ch3, and ch4 and pixel value information corresponding to each region, and is divided into nine regions as shown in FIG. 8. As shown in FIG. 8, the mask image sets to overlay the image captured by the front camera 110 input via the channel ch1 with the first, second, and third regions, and to overlay the image captured by the rear camera 120 input via the channel ch2 with the seventh, eighth, and ninth regions. The mask image sets to overlay the image captured by the left camera 130 input via the channel ch3 with the first, fourth, and seventh regions, and to overlay the image captured by the right camera 140 input via the channel ch4 with the third, sixth, and ninth regions. Herein, the first, third, seventh, and ninth regions are the overlapping regions duplicately captured by the plurality of the cameras. That is, the first region is the overlapping region duplicately captured by the front camera 110 and the left camera 130, and the third region is the overlapping region duplicately captured by the front camera 110 and the right camera 140. The seventh region is the overlapping region duplicately captured by the rear camera 120 and the left camera 130, and the ninth region is the overlapping region duplicately captured by the rear camera 120 and the right camera 140.

The control part 270 moves the image corresponding to the second, fourth, sixth, and eighth regions which are not duplicately captured, to the same regions of the surrounding image corresponding to a destination image. The control part 270 overlay-processes the first, third, seventh, and ninth regions which are the overlapping regions duplicately captured by the multiple cameras, using the mask image.

To distinguish colors, the mask image displays the second, fourth, sixth, and eighth regions in monochrome without color change. To distinguish the vehicle, the fifth region corresponding to the vehicle is set to adjust R, G, and B pixel values.

The mask image sets each pixel in the first, third, seventh, and ninth regions to have the R pixel value from 1 to 254. In particular, the mask image sets the R pixel value of each pixel in the first, third, seventh, and ninth regions to a Gradient weight value between 1 and 254 for the natural color matching as shown in FIG. 8. The first region, for example, sets the R pixel value of the pixel adjoining the second region to 1 and sets the R pixel value of the pixel adjoining the fourth region to 254 by increasing the R pixel value of the pixel closer to the fourth region.

Likewise, as shown in FIG. 8, the third region sets the R pixel value of the pixel adjoining the second region to 1 and the R pixel value of the pixel adjoining the sixth region to 254. The seventh region sets the R pixel value of the pixel adjoining the eighth region to 1 and the R pixel value of the pixel adjoining the fourth region to 254. The ninth region sets the R pixel value of the pixel adjoining the eighth region to 1 and the R pixel value of the pixel adjoining the sixth region to 254.

Herein, since the first, third, seventh, and ninth regions which are the overlapping regions of the images between the neighboring channels are separately distinguished and viewed according to brightness or lightness difference of the camera, the control part 270 can perform the overlay operation by applying Equation 4 to each pixel in the first, third, seventh, and ninth regions.

$$I'(t+1) = \alpha I_1(t) + (1-\alpha)I_2(t), 0 \le \alpha \le 1 \qquad \text{[Equation 4]}$$

In Equation 4, $I_1(t)$ and $I_2(t)$ denote image information for the overlapping region input via two channels respectively, $\alpha$ denotes the weight for the pixels in the overlapping region, and $I'(t+1)$ denotes the overlay-processed image information. Particularly, $I_1(t)$ denotes the image information for the overlapping region captured by the camera 110 installed to the front or the camera 120 installed to the rear and input via the channel ch1 or the channel ch2, and $I_2(t)$ denotes the image information for the overlapping region captured by the camera 130 installed to the left side or the camera 140 installed to the right side and input via the channel ch3 or the channel ch4.

$\alpha$ is the weight for the R pixel in the overlapping region. For example, in the adjoining part of the first region and the second region, $\alpha$ is a value ($1/255$) close to zero. In the adjoining part of the first region and the fourth region, $\alpha$ is a value ($254/255$) close to 1.

Hereafter, the overlay processing of the control part 270 on the overlapping region using the mask image is described in more detail using FIGS. 9 through 11.

FIG. 9 is a diagram illustrating a cause of the overlapping region when two cameras capture the same object.

As shown in FIG. 9, when two cameras (the first camera and the second camera) capture the same object, the shape of the object disappears or overlaps in an image synthesis boundary region because of parallax viewed by the two cameras. Such an overlapping region is the blind spot of the vehicle and appears in four corners around the vehicle. Thus, to enhance the visibility such that the driver easily recognizes the situation around the vehicle, embodiments of the present invention apply the overlay processing through the mask image.

FIG. 10 is a diagram of the weight information for the pixels in the overlapping region of the mask image according to an embodiment of the present invention, and FIG. 11 is a diagram of the image overlay-processed corresponding to FIG. 10. By changing the weight for the pixels included in the overlapping region as shown in (a) through (d) of FIG. 10, the control part 270 can represent the overlay processing result as shown in (a) through (d) of FIG. 11.

(a) of FIG. 10 and FIG. 11 shows the completely independently separated images of the two cameras based on the image synthesis boundary. That is, when the weight information of FIG. 10A with respect to the overlapping region captured through the first camera and the second camera is applied to Equation 4, the overlay-processed image of (a) of FIG. 11 can be generated.

(b) of FIG. 10 and FIG. 11 overlay-processes two images using an alpha blend method which linearly sets the weight between the adjacent pixels. In (b), the most natural image can be generated by linearly setting the weight between the adjacent pixels. Of the overlapping processing method of (a) through (d), (b) is most similar to the Gradient weight setting method explained in FIG. 8 and can produce the most natural image.

(c) of FIG. 10 and FIG. 11 divides sections and overlay-processes such that an odd column outputs the image captured by the first camera and an even column outputs the image captured by the second camera. (d) of FIG. 10 and FIG. 11 overlay-processes such that the odd column outputs the image captured by the first camera and the even column outputs the image captured by the second camera, by adding the row segmentation to (c).

As such, the image generating apparatus 200 can generate the surrounding image naturally showing the overlapping region by overlay-processing the overlapping regions occurring between the corrected images E1, E2, E3 and E4 through the mask image.

Figure 12:
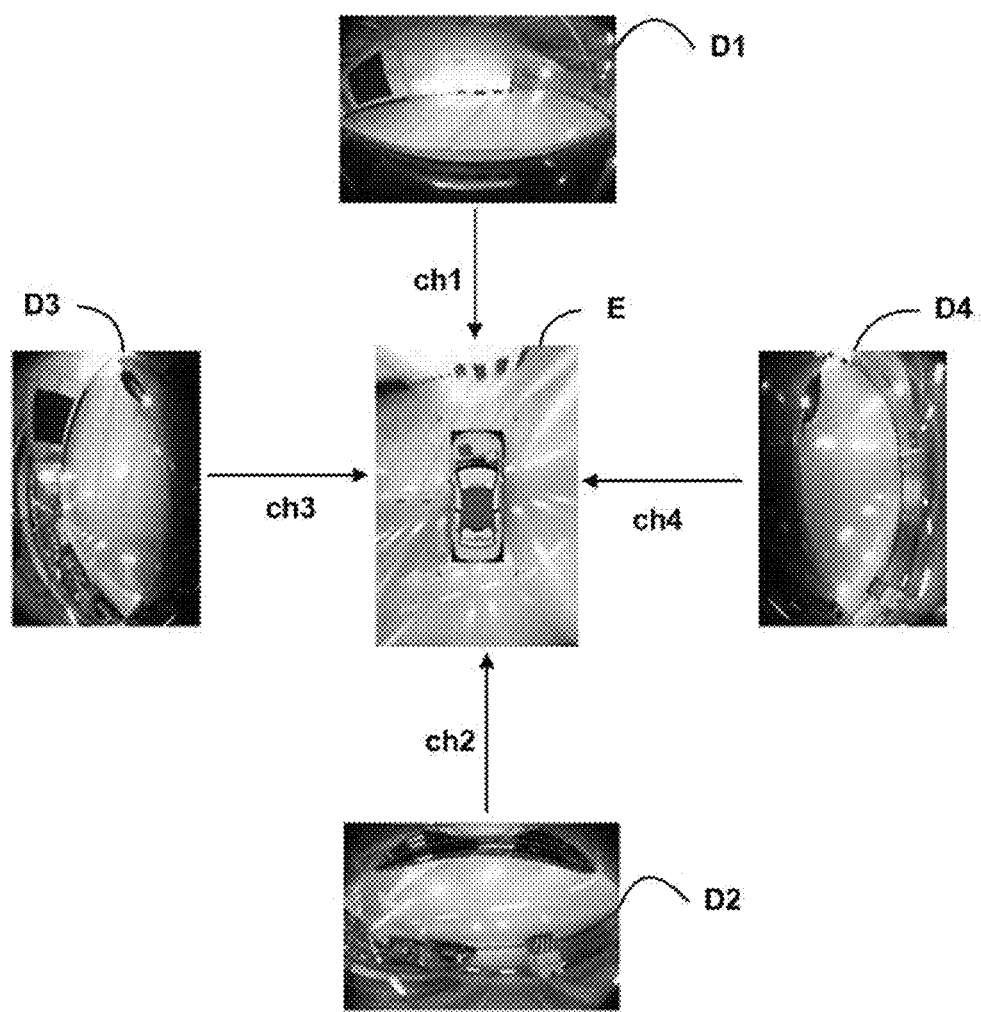
FIG. 12 is a diagram of a surrounding image including the overlay-processed overlapping region according to an embodiment of the present invention.

FIG. 12 is a diagram of the surrounding image including the overlay-processed overlapping region according to an embodiment of the present invention.

As shown in FIG. 12, the image generating apparatus 200 can receive the images D1, D2, D3 and D4 captured through the cameras 110, 120, 130, and 140 via the four channels ch1, ch2, ch3, and ch4, overlay-process the overlapping regions using the mask image, and thus generate the surrounding image E synthesized to naturally display the overlapping regions.

Meanwhile, since the brightness of the images D1, D2, D3 and D4 captured through the cameras 110, 120, 130, and 140 can vary, the image generating apparatus 200 according to an embodiment of the present invention sets four indicators for the image D1 captured by the camera 110 installed to the front of the vehicle and calculates an average value of the brightness for the four indicators. The image generating apparatus 200 applies the average brightness value to the four images D1, D2, D3 and D4 through a histogram equalizer so that the synthesized surround image E has the same brightness as much as possible.

Figure 13:
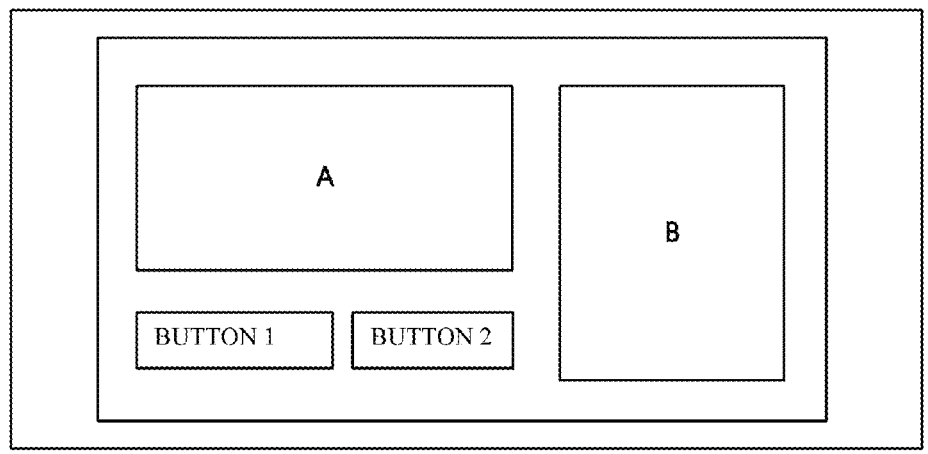
FIG. 13 is a diagram of a screen configuration of a display apparatus according to an embodiment of the present invention.
Figure 14:
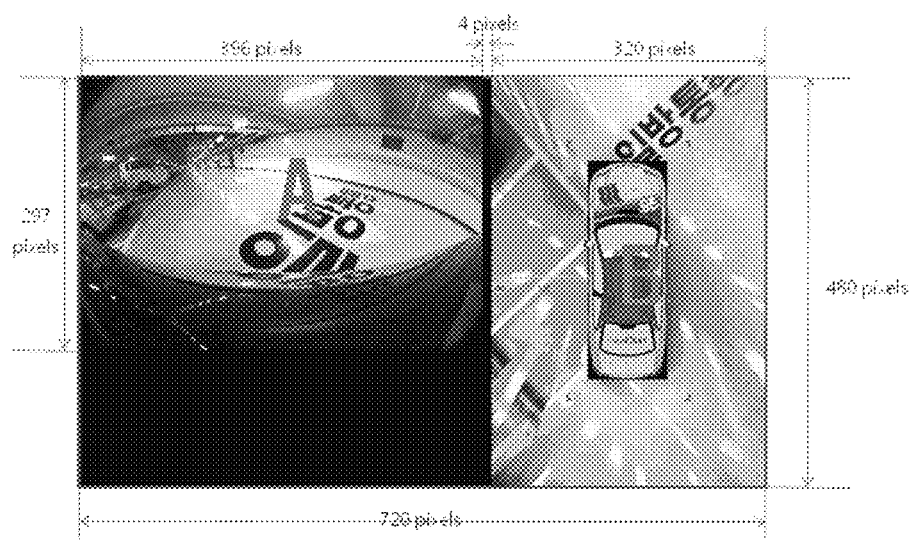
FIG. 14 is a diagram of a screen displayed in the display apparatus of FIG. 13.

FIG. 13 is a diagram of a screen configuration of the display apparatus according to an embodiment of the present invention, and FIG. 14 is a diagram of a screen displayed in the display apparatus of FIG. 13.

As shown in FIGS. 13 and 14, the screen A outputs the front camera image D1 when the vehicle is running, and displays the rear camera image D2 when the vehicle is parking. Herein, the control part 270 detects a reverse gear on/off signal of the gearbox over the CAN communication of the vehicle and thus automatically switches the screen A. The driver can selectively change the front camera image D1 and the rear camera image D2 by directly touching a first button or a second button. Herein, the driver may change the image using a jog dial.

When the screen A displays the rear camera image D2 in case of the parking, the control part 270 receiving a steering angle signal of the vehicle via the communication part 290 can display a parking guide line and an expected trajectory in the screen A and thus provide convenience to the driver in the parking.

As shown in FIGS. 13 and 14, the screen B displays the surrounding image E synthesized by the image generating apparatus 200. Herein, the control part 270 can receive a signal from the communication part 290 and display the left camera image D3 or the right camera image D4 during the driving. Also, by considering safety of the driver, when the speed of the vehicle exceeds, for example, 20 km, the control part 270 may switch the screen A and the screen B to the off state.

While the invention has been shown and described with reference to certain preferred embodiments thereof, it will be understood by those skilled in the art that various changes in form and details may be made therein without departing from the spirit and scope of the invention as defined by the appended claims.

INDUSTRIAL APPLICABILITY

According to the present invention, by removing the blind spots around the vehicle and correcting the overlapping regions captured by the plurality of the cameras into the natural images, the driver can accurately recognize the situation around the vehicle. Therefore, the driver can park the vehicle in the convenient manner and drive the vehicle forward or backward in the safe manner even without looking at the side-view mirror or the rearview mirror.

What is claimed is:

1. A method for generating a vehicle surrounding image comprising:
   receiving images captured by cameras installed to front, rear, left, and right sides of a vehicle via channels connected to the cameras respectively;
   generating a plurality of corrected images by correcting the captured images in a top view form;
   generating a surrounding image of the vehicle by overlay-processing the plurality of the corrected images using a mask image containing region information per channel and weight information for pixels constituting at least one region; and
   displaying the surrounding image;
   wherein the plurality of the corrected images is generated using a look-up table,
   wherein overlapping regions between the plurality of the corrected images are overlay-processed using the following equation:

$$I'(t+1)=\alpha I_1(t)+(1-\alpha)I_2(t), 0\leq\alpha\leq 1$$

where $I_1(t)$ and $I_2(t)$ denote image information for the overlapping region input via two channels respectively, $\alpha$ denotes a weight for pixels in the overlapping region, and $I'(t+1)$ denotes the overlay-processed image information,
   wherein the mask image is set to attain a Gradient weight for the pixels in the overlapping region; and
   wherein the mask image includes a first region duplicately captured through the front camera and the left camera of a vehicle, a third region duplicately captured through the front camera and the right camera of the vehicle, a seventh region duplicately captured through the rear camera and the left camera of the vehicle, a ninth region duplicately captured through the rear camera and the right camera of the vehicle, a second region captured through the front camera of the vehicle, without being duplicately captured through any other camera, a fourth region captured through the left camera of the vehicle, without being duplicately captured through any other camera, a sixth region captured through the right camera of the vehicle, without being duplicately captured through any other camera, an eighth region captured through the rear camera of the vehicle, without being duplicately captured through any other camera, and a fifth region on which an image corresponding to the vehicle is displayed; and wherein the generating the surrounding image includes controlling the mask image to display the second, fourth, sixth, and eighth regions in monochrome without color change, to adjust R, G, and B pixel values of the fifth region, and to set an R pixel value of each pixel in the first, third, seventh, and ninth regions to a Gradient weight value between 1 and 254 for color matching.

2. The method of claim 1, wherein the generating of the plurality of the corrected images comprises:

correcting distortion of the captured images according to lens distortion of the cameras;

transforming a viewpoint of the captured images into the top view form; and rotating, translating, or scaling the captured images transformed into the top view form.

3. The method of claim 1, wherein the generating of the plurality of the corrected images comprises:

correcting distortion of the captured images according to lens distortion of the cameras;

and projective transforming the captured images into a rectangular top view form.

4. The method of claim 1, further comprising:

calculating an average brightness value of four indicators through the camera installed to the front side and applying the average brightness value to the surrounding image.

5. An apparatus for generating a vehicle surrounding image comprising:

an image input part for receiving images captured by cameras installed to front, rear, left, and right sides of a vehicle via channels connected to the cameras respectively;

an image processing part for generating a plurality of corrected images by correcting the captured images into a top view form;

an image synthesis part for generating a surrounding image of the vehicle by overlay-processing the plurality of the corrected images using a mask image containing region information per channel and weight information for pixels constituting at least one region;

a display part for displaying the surrounding image; and a control part for overlay-processing overlapping regions between the plurality of the corrected images, wherein the overlapping regions between the plurality of the corrected images are overlay-processed using the following equation:

$$I'(t+1)=\alpha I_1(t)+(1-\alpha)I_2(t),\ 0\leq\alpha\leq 1$$

where $I_1(t)$ and $I_2(t)$ denote image information for the overlapping region input via two channels respectively, $\alpha$ denotes a weight for pixels in the overlapping region, and $I'(t+1)$ denotes the overlay-processed image information, wherein the mask image is set to attain a Gradient weight for the pixels in the overlapping region, wherein the plurality of the corrected images is generated using a look-up table, and wherein the mask image includes a first region duplicately captured through the front camera and the left camera of a vehicle, a third region duplicately captured through the front camera and the right camera of the vehicle, a seventh region duplicately captured through the rear camera and the left camera of the vehicle, a ninth region duplicately captured through the rear camera and the right camera of the vehicle, a second region captured through the front camera of the vehicle, without being duplicately captured through any other camera, a fourth region captured through the left camera of the vehicle, without being duplicately captured through any other camera, a sixth region captured through the right camera of the vehicle, without being duplicately captured through any other camera, an eighth region captured through the rear camera of the vehicle, without being duplicately captured through any other camera, and a fifth region on which an image corresponding to the vehicle is displayed;

wherein the generating the surrounding image includes controlling the mask image to display the second, fourth, sixth, and eighth regions in monochrome without color change, to adjust R, G, and B pixel values of the fifth region, and to set an R pixel value of each pixel in the first, third, seventh, and ninth regions to a Gradient weight value between 1 and 254 for color matching.

6. The apparatus of claim 5, wherein the image processing part corrects distortion of the captured images according to lens distortion of the cameras, transforms a viewpoint of the captured images into the top view form, and rotates, translates, or scales the captured images transformed into the top view form.

7. The apparatus of claim 6, further comprising:

a communication part for receiving and providing driving state information of the vehicle to the control part, wherein the control part determines whether to display the surrounding image according to the driving state of the vehicle.

8. A system for generating a vehicle surrounding image comprising:

a plurality of cameras installed to front, rear, left, and right sides of a vehicle for outputting captured images via respective channels;

an image generating apparatus for generating a plurality of corrected images by correcting the input captured images into a top view form, and generating a surrounding image of the vehicle by overlay-processing the plurality of the corrected images using a mask image containing region information per channel and weight information for pixels constituting at least one region; and a display apparatus for displaying the surrounding image;

wherein the image generating apparatus overlay-processes overlapping regions between the plurality of the corrected images, wherein the overlapping regions between the plurality of the corrected images are overlay-processed using the following equation:

$$I'(t+1)=\alpha I_1(t)+(1-\alpha)I_2(t),\ 0\leq\alpha\leq 1$$

where $I_1(t)$ and $I_2(t)$ denote image information for the overlapping region input via two channels respectively, $\alpha$ denotes a weight for pixels in the overlapping region, and $I'(t+1)$ denotes the overlay-processed image information, wherein the mask image is set to attain a Gradient weight for the pixels in the overlapping region, wherein the plurality of the corrected images is generated using a look-up table, and wherein the mask image includes a first region duplicately captured through the front camera and the left camera of a vehicle, a third region duplicately captured through the front camera and the right camera of the vehicle, a seventh region duplicately captured through the rear camera and the left camera of the vehicle, a ninth region duplicately captured through the rear camera and the right camera of the vehicle, a second region captured through the front camera of the vehicle, without being duplicately captured through any other camera, a fourth region captured through the left camera of the vehicle, without being duplicately captured through any other camera, a sixth region captured through the right camera of the vehicle, without being duplicately captured through any other camera, an eighth region captured through the rear camera of the vehicle, without being duplicately captured through any other camera, and a fifth region on which an image corresponding to the vehicle is displayed; and wherein the generating the surrounding image includes controlling the mask image to display the second, fourth, sixth, and eighth regions in monochrome without color change, to adjust R, G, and B pixel values of the fifth region, and to set an R pixel value of each pixel in the first, third, seventh, and ninth regions to a Gradient weight value between 1 and 254 for color matching.

\* \* \* \* \*